United States Patent [19]

Ballas

[11] 4,067,108

[45] Jan. 10, 1978

[54] ROTARY CUTTING ASSEMBLY

[75] Inventor: George C. Ballas, Houston, Tex.

[73] Assignee: Weed Eater, Inc., Houston, Tex.

[21] Appl. No.: 747,380

[22] Filed: Dec. 3, 1976

Related U.S. Application Data

[63] Continuation-in-part of Ser. No. 633,456, Nov. 18, 1975, Pat. No. 4,035,912.

[51] Int. Cl.² ............................................. B26B 27/00
[52] U.S. Cl. ...................................... 30/276; 30/296 R
[58] Field of Search ................. 30/231, 232, 291, 294, 30/296 R, 298

[56] References Cited

U.S. PATENT DOCUMENTS

| | | | |
|---|---|---|---|
| 687,930 | 12/1901 | Wiesedeppe | 30/291 |
| 3,015,160 | 1/1962 | Fogle | 30/232 |
| 3,323,208 | 6/1967 | Hurley | 30/124 |
| 3,888,006 | 6/1975 | Roberts | 30/232 |

FOREIGN PATENT DOCUMENTS

| | | | |
|---|---|---|---|
| 1,281,450 | 12/1961 | France | 30/276 |

*Primary Examiner*—Jimmy C. Peters

[57] ABSTRACT

Apparatus for cutting, trimming, and edging vegetation, and the like, is provided with a rotatable disc-like head having a plurality of string-like cutting member removably and replaceably extending from its periphery for cutting adjacent vegetation and the like. A snap-on resilient string cutter is provided on the tubular handle for trimming the cutting members to the correct length prior to operation.

7 Claims, 8 Drawing Figures

ROTARY CUTTING ASSEMBLY

RELATED APPLICATIONS

This application is a continuation-in-part of prior copending U.S. application Ser. No. 633,456, filed Nov. 18, 1975 now U.S. Pat. No. 4,035,912 which issued July 19, 1977.

BACKGROUND OF INVENTION

This invention relates to apparatus and devices for cutting vegetation and the like, and more particularly relates to improved apparatus for cutting vegetation with a flexible non-metallic cord member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776; is now widely known and used for this purpose.

This invention relates to an improved cutting assembly in the form of a rotary head for a rotary edger, trimmer or the like. The preferred embodiment is in the form of a portable type mowing and edging tool wherein the cutting element is safe in most uses and avoids the hazardous conditions created by prior art devices.

The prior art is prolix with attempts at solutions to provide a safe, efficient and simply constructed rotary head for rotary mowers, edgers, trimmers and the like. One attempt comprises a rotating metal bar or the like which is rotated at sufficient speeds to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid-type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn and edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German Petty Pat. Nos. 6,919,841; 6,919,842; 6,919,843; 6,919,844; 6,938,265; 7,043,648 and 7,238,972, one or more embodiments of a lawn mowing or trimming device having a disc-like head member arranged to be rotated by a motor, and containing a spool which is housed therein in coaxial relationship to the shaft of the motor. A length of flexible non-metallic line is coiled about the spool, whereby its free travelling end extends generally peripherally from the spool and head, and whereby such free travelling end will be swung arcuately about upon actuation of the motor to cut adjacent vegetation in the manner of a flail.

The German device will cut effectively only lightweight vegetation and suffers severely from a high-breakage rate of the plastic line.

These disadvantages of the prior art, and especially the aforementioned German device, are overcome with the present invention, and a commercially acceptable embodiment of a vegetation cutter and the like is herein provided which is not only fully capable of cutting vegetation under most operating conditions, but which is also fully capable of other tasks completely beyond the capabilities of the German device, such as cleaning dead leaves, trash and other such debris from along fences, walls and the trunks or stems of trees and bushes. More particularly, however, the embodiment of the present invention is capable of operation with a much higher efficiency and much lower lower breakage rate for its cutting strings.

SUMMARY OF INVENTION

This invention is for an improved cutting assembly for a rotary mower, edger, trimmer or the like. It includes a body member arranged for rotation about an axis generally perpendicular with or normal to the cutting plane. It preferably includes at least two non-metallic cutting lines attached to the body member for rotation therewith in the cutting plane, although a single line may be effective for present purposes under proper circumstances. More particularly, provision is made via metallic bearing surfaces for the reduction of vibration between the cutting lines and portions of the apparatus and between adjacent portions of the cutting lines, and for higher speed and cutting efficiency.

Each line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is on the order of 75:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking condition whereby the effective working length of the line or lines may be lengthened at desired times as the working length becomes shortened due to breakage or fraying during use thereof. Certain embodiments of the invention may have line storage means supported in the body member, which storage means are in the form of spools which are locked from rotation, but which may be disengaged whereby additional line may be paid out to replace or replenish the effective working length of the cutting lines when they become shortened during use. Another particularly significant feature is that the configuration of the cutting head is such as to prevent angular deformation or "kinking" of the cutting lines, as will hereinafter be explained in detail.

In one particularly ideal embodiment of the present invention, a circular head member is provided which contains four separate spools spaced about the axis of the head. Each spool supports a separate cutting strand or string, which greatly enhances the ability of this device to cut through impacted vegetation and the like, and to permit this embodiment of the invention to perform tasks which are completely beyond the capacity of devices such as that described and depicted in the aforementioned German patents.

In addition, however, it is a particular feature of the present invention to provide cutting strings having a length such as to maximize the cutting effectiveness of the apparatus, and also such as to minimize the likelihood of entanglement.

Inasmuch as the proper length of the cutting members is a significant feature of the present invention, it is a feature of the four-strand embodiment to provide a convenient technique for paying out substantially the proper length of strand in the event breakage occurs. Accordingly, and as will hereinafter be described in detail, the spools are recessed in socket-like compartments within the circular head, whereby a detent effect is achieved to limit rotation of each spool within the head. In another embodiment, a blade or the like is removably mounted above the circular head, whereby each cutting member may be cut to the proper length prior to operation of the unit.

In its broadest concept, any type of motor may be employed for purposes of the present invention to rotate the head assembly. A four-string cutting device has greater cutting capabilities than a two-string cutting device, for example, and thus is more desirable for use in larger areas such as golf courses and the like, or in more heavily impacted or overgrown regions. Under such circumstances, a gasoline-powered engine is normally to be preferred over an electric motor for the simple reason that an electric motor will necessitate a cord for connection with a source of electrical power, and in larger or wilder areas the cord will necessarily be too long to be practical.

In addition to the various other problems of the devices of the prior art, it has also been discovered that excessive line breakage will occur from another cause not heretofore discussed. As hereinbefore explained, the subject cutting device operates by revolving the circular cutting head at a relatively high velocity, whereby the cutting lines are caused to be more or less rigidly and radially extended from the periphery of the head. During such revolvement, however, these lines are caused to vibrate longitudinally as well as laterally.

It is a feature to reduce the vibration between the cutting line and any portion of the cutting device against which the cutting line is caused to rub. In a particularly suitable embodiment of the present invention, therefore, such vibration is reduced by providing that the nylon cutting lines be disposed against metallic bearing surfaces preferably composed of brass or some other suitable metal or other substance.

It is yet another feature of the invention to provide a removable cutter for the lines which cutter is releasably attached to the tubular handle member above the cutting plane. Prior to a cutting operation, the flexible cords may be cut to their desired effective working length.

These and other features and advantages of the present invention will become apparent from the following detailed description, wherein reference is made to the figures in the accompanying drawings.

IN THE DRAWINGS

FIG. 1 is a view showing an operator operating a portable apparatus having four cutting strings extending peripherally from a rotating circular head assembly or the like.

FIG. 2 is a pictorial view taken generally along line 2—2 of FIG. 1 showing the head assembly of this invention in a dynamic or rotating condition.

FIG. 6 is a pictorial representation of a portion of the apparatus depicted in FIG. 2 which includes the peripheral aperture through which a cutting line extends.

DETAILED DESCRIPTION

Figures 1, 2, 6:
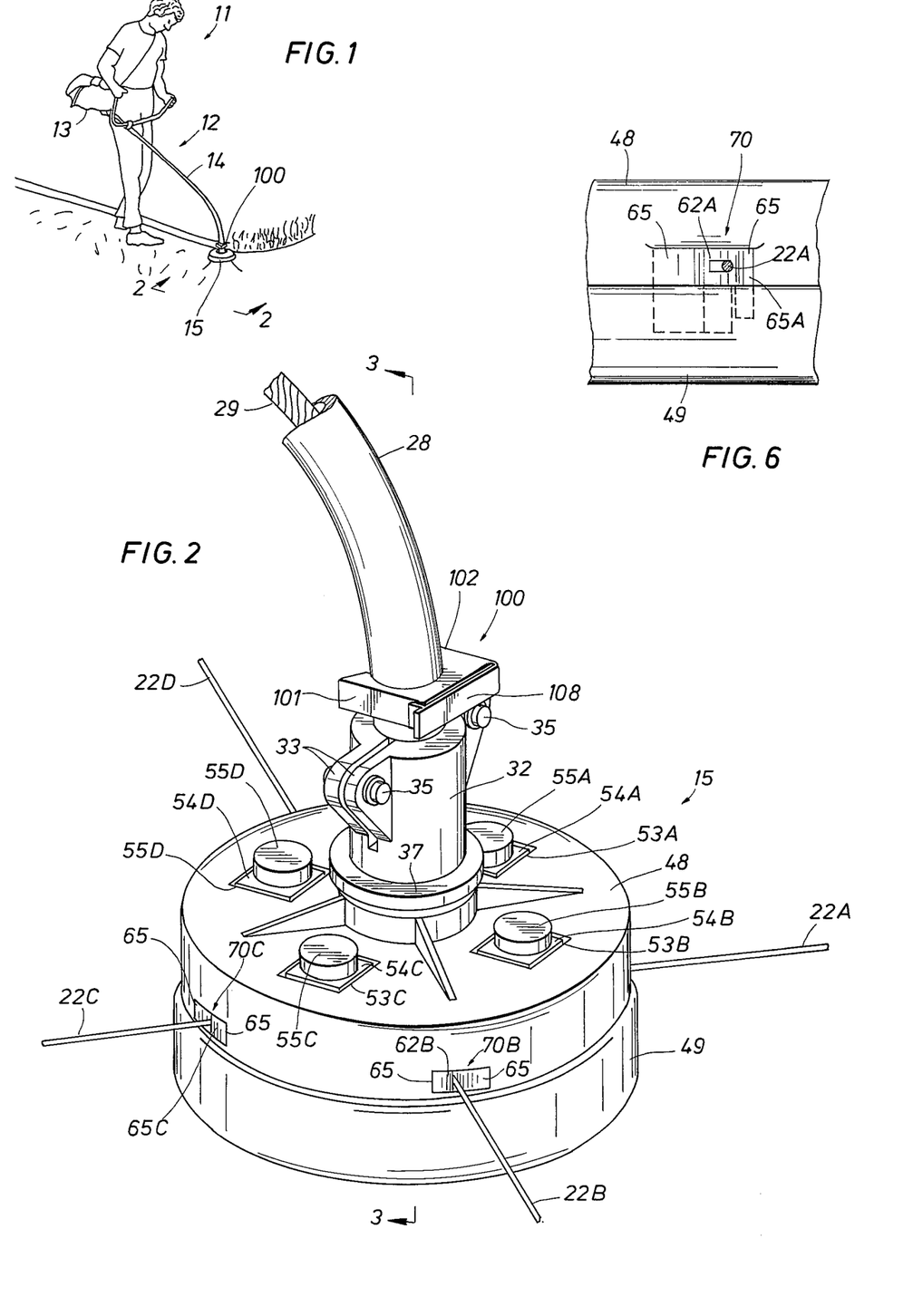

Referring now to FIG. 1, an operator 11 is shown carrying a portable type lawn mowing and edging device generally designated by the numeral 12 and which is of the type preferred for heavier tasks or for use in locations where electrical power is not immediately and conveniently available to operator 11. Accordingly, the apparatus may be composed of a tubular handle member or casing 14 having a gasoline-powered engine 13 mounted at one end, and having a four-string circular housing or cutting element 15 rotatable at and about the lower end of the tubular casing 14 by suitable drive means such as a flexible cable or shaft (not depicted in FIG. 1) within the casing 14. Such a device 12 is portable, as indicated in FIG. 1, and the cutting plane of the cutting element 15 may be easily arranged to be either horizontal or vertical, or tilted at any angle, to cut along sidewalks, around trees and rocks, and along fences and the like, where it is either unsafe or difficult to cut with conventional apparatus, merely by turning or manipulating the casing 14.

Referring now to FIG. 2, there may be seen an enlarged view of the cutting element 15 represented generally in FIG. 1, and more particularly showing how the lower end of the casing 28 houses the lower end of a flexible cable or drive shaft 29, and how the cutting element 15 is composed of a rotary body 48 fixedly secured thereto for circular revolvement about its axis, and a lower cap 49 attached to the rotary body 48 in a manner hereinafter described.

When the gasoline-powered engine 13 is inactivated and the rotary body 48 is in a static condition, the four cutting strands or lines 22A-D will tend to flexibly dangle from the equally spaced-apart windows 70A-D to the extent permitted by their inherent characteristics. When the rotary body 48 is rotated at normal operating velocities, however, the lines 22A-D will tend to stand out rigidly (but also yieldably) from the periphery of the rotary body 48, as indicated in FIG. 2.

The cutting lines 22A-D may be composed of a variety of materials, as for example an elastoplastic extrusion which has been stretched to align the molecules axially. An especially desirable example of such line is a nylon monofilament of the type often employed as fishing line. However, other materials may be used for this purpose, as for example, yarn, cord, rope, twine, braided line, or monofilament plastics of other types, whether described as elastoplastic, elastomeric, natural fiber, or snythetic fiber, and whether compounded of several materials. Nevertheless, there are certain parameters within which the lines must fall in order to be effective for the purposes of the present invention.

The cutting lines 22A-D should preferably have sufficient fatigue, abrasion, and impact resistance to allow reasonable service life. Further, the lines 22A-D should have sufficient tensile strength to allow a reasonable service life, and should have as small a diameter as is consistent with the foregoing parameter so that the sharpest cutting edge is provided for effecting cutting of the grass, weeds or the like. The lines 22A-D should preferably be as light-weight as possible so that when the line shears or breaks during use and is thrown from the cutter head, it will cause the least damage upon contact with persons or objects.

Effective cutting may be achieved with lines 22A-D formed of a metal, and such lines will also have a greater tensile strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier engine 13 makes the use of metallic lines 22A-D undesirable for present purposes. On the other hand, the relatively small mass of a line 22 formed, for example, of an extruded nylon monofilament, creates complex design problems which must be effectively solved to achieve effective cutting, and this will become even more apparent when it is appreciated that only the last 1 full inch or so, of each of the lines 22A-D, is actually impacted against the vegetation sought to be cut.

In view of the above, and in further regard to the theory of the invention, it should be understood that in a rotating system as above described, the tip impact has been found to be a function of the mass of the tip of the flexible line members 22A-D and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered.

In order to understand the relationship of tip impact being a function of tip mass and tip velocity, each of the latter two must be considered separately as will be set forth hereinafter.

Thus, it has been determined that tip mass is a function of the mean cross-sectional diameter of the line member and the mass of the material of construction of the line member. Since it is contemplated, as above set forth, to construct the line member of a material such as nylon, it will be apparent that this light-weight type of material will possess a very small mass. Thus, in its relationship to tip mass, the mass of the material of the line member will be negligible. Therefore, it will be readily seen that the primary factor determining tip mass is the mean cross-sectional diameter of the line member. Hence, when speaking in terms of tip mass, it should be clear that this term is considered to include primarily the means cross-sectional diameter of the line member and with little or no emphasis upon the mass of the material of which the line member is made.

As hereinbefore explained, tip impact is a function of tip mass and tip velocity, tip mass being essentially the mean cross-sectional diameter of the line member. Considering tip velocity, it has been found that this feature of the tip impact is a function of each of the following four parameters:

1. the mean cross-sectional diameter of the line member,
2. the length of the line member,
3. the diameter of the head and
4. the RPM of the motor shaft.

A variation of any one or more of the above four factors will obviously vary the tip velocity, and therefore vary the tip impact feature. Thus, tip velocity will change as the diameter of the line member is increased or decreased as the line member is shortened or lengthened, as the size of the head is increased or decreased, and as the speed of the motor is raised or lowered. In order to understand how each of these factors affects tip velocity, it is necessary to consider each one in its relationship to the other and in its function in the particular vegetation cutting environment.

Referring to the mean cross-sectional diameter of the line member, this factor has been found to have an effect upon tip velocity due to a phenomenon known as "windage". Thus, as the line member is rotated it encounters the resistance of air. It will be apparent that the resistance of air to the passage of the rotating line member causes a drag on the line member. Hence, the greater the diameter of the line member, the greater is the drag. Conversely, smaller diameter line members create less drag. Thus, variation of the diameter of the line member varies the "windage" or drag factor, which in turn varies the tip velocity, thereby changing the tip impact.

With reference to the length of the line member, this factor contributes in some degree to the "windage" phenomenon noted above. Thus, a given length of line member of a specified cross-sectional diameter will encounter the resistance of air as it is rotated. The resultant drag on the given length of line member will remain constant as the length of the line member remains the same. If, however, the line length is increased, a greater drag factor is produced. If, on the other hand, the length of line is decreased, drag is reduced, tip velocity is increased, and tip impact is improved, resulting in a better cut. It should, in addition, be noted that the relationship between the length of the line member and its cross-sectional diameter contribute to the windage or drag factor. Thus, to minimize windage or drag, it should be apparent that a line member of the shortest effective length and the smallest effective mean cross-sectional diameter be employed. These minimum requirements present the least amount of surface area subject to the resistance of air during rotation, and therefore create the least amount of drag.

In addition to drag, the length of the line member also has an additional effect upon tip velocity, partially due to the nature of the line member itself. Thus, under normal operating conditions, the line member will be extended outwardly in a more or less straight fashion, thereby utilizing its total actual length. This is due to the centrifugal force generated upon rotation of the line member, which force acts to straighten out the flexible line member.

However, if during the operation of the device, the resistances of the air and/or grass against the line member are sufficient to overcome the centrifugal force tending to straighten out the flexible line along its axial length, the line member at its outermost portion will tend to trail behind that portion of the line member attached to the head. This trailing effect is due to the flexible nature of the line member itself, as well as to the resistances encountered. Needless to say, any trailing of the tip portion of the line member behind the portion of the line attached to the head, reduces the effective overall length of the line member, thereby reducing the tip velocity which in turn reduces tip impact. In rather extreme cases of trailing, the lag of the tip of the line member will be such as to provide an arcuate shape to the line member, rather than a substantially straight line extension as is desired.

Referring now to the head diameter factor and its relationship to the tip velocity, it should be understood that the head supports a portion of the line member. Thus, to theoretically determine the exact length of the line member factor, the radius of the head must be taken into account. For practical purposes, therefore, line length is actually the length of exposed line, that is, the length of line measured from the circumference of the head to the tip of the line member, plus a distance equal to the radius of the head. Obviously, a change in the size of the head will therefore affect the tip velocity due to its contributing a radial length to the line member itself.

In addition to line member length affect, head diameter affects tip velocity due to its mass. For example, assuming identical materials of construction of the head, it will be apparent that a head of large diameter will of necessity weigh more than a head of small diameter. Since mass constitutes a load on the motor any variation of mass of the head will vary the motor load which, in turn, will vary tip velocity and tip impact. Therefore, it should be apparent that the selection of the materials of construction of the head and the particular head diameter selected are important factors in arriving at an assembly for effectively and efficiently cutting vegetation.

Considering the RPM of the motor shaft and its effect upon tip velocity and, therefore, tip impact, it should be noted that any decrease in RPM will reduce the tip velocity. Conversely, a better tip velocity is achieved as RPM increases. Primarily of concern is the RPM decrease and the factors contributing thereto. Given a preselected motor design of specific RPM rating, it will be apparent that this particular RPM rating may be decreased by variation in system design. Thus, any change in the load on the motor shaft will affect RPM. For example, an increase in mass will decrease the RPM. A larger diameter head, of greater mass, will put a greater load on the shaft, thereby affecting RPM. A line member of greater length and/or greater mean cross-sectional diameter will also add mass to the system and therefore increase the load on the motor shaft, thus affecting RPM and tip velocity and impact, but to a lesser extent. Another load factor on the motor shaft tending to affect RPM is the result of "windage" or drag. As set forth above, this resistance phenomenon is a function of the length of the line member and the cross-sectional diameter of same. Thus, to maintain a minimum of drag results in a substantially lessened effect upon load, thereby reducing drag as a factor in RPM variation. With reference to the trailing effect of the line member as noted above, it should be understood that the RPM of the motor shaft must be sufficient to impart enough of a centrifugal force to the line member to maintain the line member in a substantially straight line relationship rather than the somewhat arcuate shaped configuration produced when resistances are encountered.

It should therefore be apparent, that numerous factors and interrelationships therebetween are involved in arriving at an effective and efficient vegetation cutting assembly of the flexible line member type. The design parameters and selection of same are complex since many are dependant one upon the other, and therefore critical. Thus, it will be seen that more is involved herein than just merely rotating a flexible string.

Referring now to FIGS. 2-6, it may be seen that the lower end of the drive shaft 29 in the casing 28 is provided with a square end 30, which is arranged for insertion into a coupling 31 for rotation therewith. Coupling 31 is arranged for rotation in a power head generally designated by the numeral 32, which is arranged for attachment to the lower end of casing 29 as shown. These attaching means take the form of two oppositely spaced-apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 may be provided with an enlarged flange 37 thereabout and with a central aperture therethrough in which is press-mounted a pair of bushings 38 and 39.

The lower end of coupling 31 is arranged for threading engagement with a rigid drive shaft 40 which extends downwardly therefrom and is spaced from the lower end of coupling 31 by thrust washer 41. Shaft 30 extends downwardly through bushings 38 and 39 and is provided with an enlarged portion 42 which acts as a thrust bearing against lower bushing 39 and attached to the lower end thereof a thrust flange 43 and a lower extending portion 44 which extends downwardly therefrom and is arranged for threading engagement with metal insert 47 embedded in rotary head or body 48. The body 48 may be of either plastic or metal and is arranged for rotation by shaft 40 and is provided with cutting lines 22A-D.

Rotary body 48 is provided with cap 49 which is arranged for fitting about the bottom portion thereof and extending up about the sides thereof a substantial distance. Rotary body 48 is arranged for demounting from casing 28 by loosening clamping screws 35, which permits removal of power head 32 from casing 28 and separation of drive shaft 29 from coupling 31 and power head 32 and, subsequently, unthreaded from rotary body 48, which permits removal of cap 49 and access to the interior of rotary body 48. However, it will also be noted that cap 49 is locked to the rotary body 48 by a bolt 45, which is threadedly connectable to the lower threaded end of the insert 47, and which is secured in the cap 49 by a rotatable bushing 46.

Body 48 is provided with a plurality of means for storing a supply of cutting lines therein, which cutting lines are arranged for paying out at predetermined times to vary the effective working lengths of the cutting lines.

Figure 4:
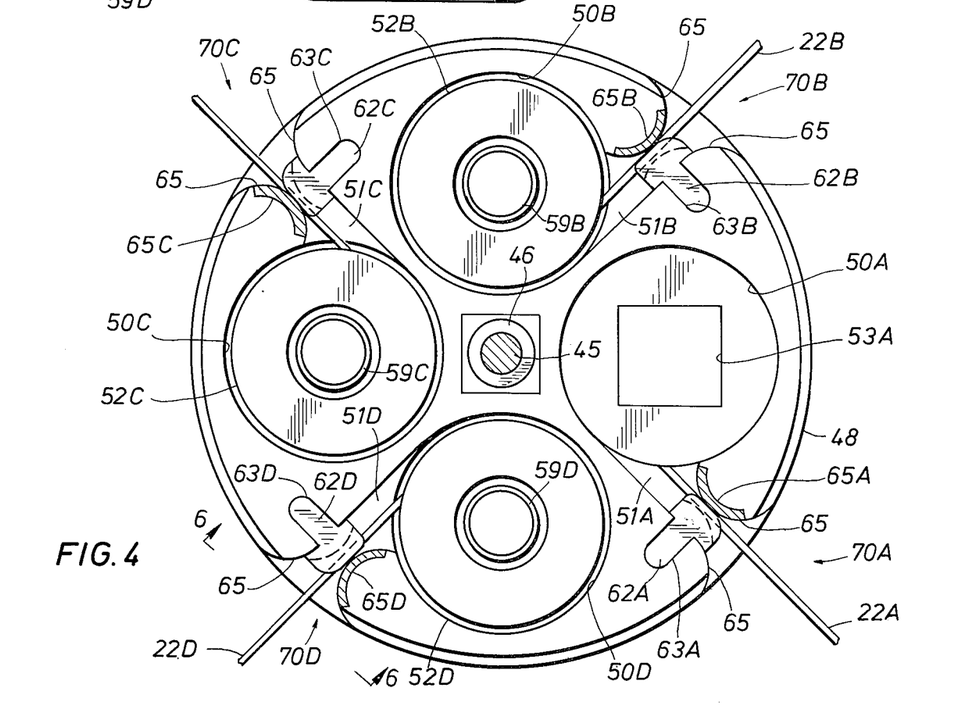
FIG. 4 is a central vertical sectional view of the apparatus depicted in FIGS. 2 and 3 and depicting means for storing a supply of line which may be paid out in preselected lengths to extend the effective working length of the cutting lines from the periphery of the cutting assembly.

Accordingly, body 48 is provided with a plurality of compartments 50A–50D, each of which is spaced in a quadrant of rotary body 48 as shown in FIG. 4. Each of spool openings 50A–D is connected with one of a corresponding plurality of line exit channels 51A–D leading outwardly to the periphery of rotary body 48 as shown. The outward ends of exit channels 51A–D form windows 70A–D having sidewalls 65 curved or otherwise streamlined so as to provide a minimum of stress on the cutting lines 22A–D which are extended radially outwardly therethrough.

Figures 3, 5:
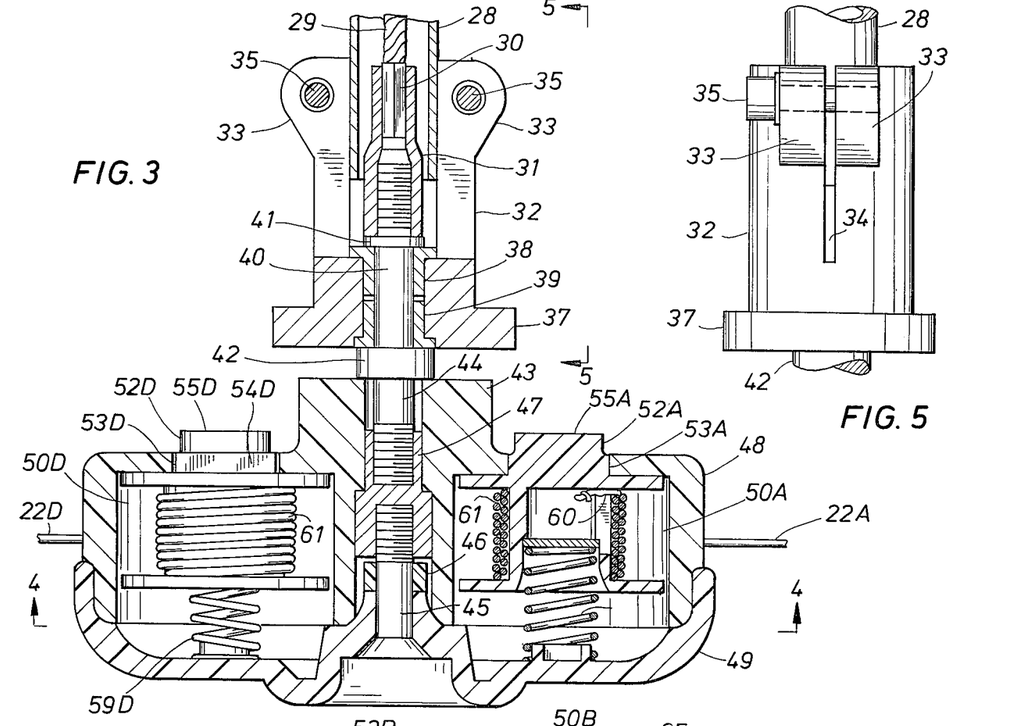
FIG. 3 is a cross sectional view of the apparatus depicted in FIG. 2 but showing the cutting assembly in the static or nonrotating position.
FIG. 5 is a side elevation view taken along line 5—5 of FIG. 3.

As indicated in FIGS. 2–4, each of the spools 52A–D are positioned on each of a corresponding plurality of thrust springs 59A–D, which are appropriately secured to the inside surface or face of the cap 49, and which have their upper ends inserted into lower coaxial apertures in the spools 52A–D. The upper ends of the spools 52A–D may be formed in the manner of square or non-circular protrusions 54A–D non-rotatably inserted upwardly through apertures 53A–D of corresponding shape, and surmounted by knobs 55A–D.

In addition, each of spools 52A–D has wound thereon a supply 61 of cutting lines 22A–D of the aforesaid type, with the inward end projecting through an opening 60 provided in spools 52A–D through which one end of each of the cutting lines 22A–D may be threaded and knotted as shown on the right side of FIG. 3. There is thus provided a supply 61 of cutting lines 22A–D on each of spools 52A–D. The opposite end of each of cutting lines 22A–D is arranged for paying out through a line exit channel 51A–D leading to and terminating in a window 70A–D as shown in FIG. 4. Each of line exit channels 51A–D is provided with elastomeric line retainers 62A–D which may be press-fitted in slots 63A–D such that line retainers 62A–D constantly bear against the protruding end of each of cutting lines 22A–D. The resistance exerted by line retainers 62A–D is such that they can be overcome by pulling on lines 22A–D.

The advantages of this arrangement will become immediately apparent when it is recognized that the thrust springs 59A–D will normally thrust the spools 52A–D upwardly within the compartments 50A–D within the rotary body 48, whereby the non-circular portions or protrusions 54A–D will be inserted upwardly through the apertures 53A–D in the body 48. When in this position, the spools 52A–D cannot be rotated within their respective compartments, 50A–D, and this will limit the length of the lines 22A–D extending from the periphery of the body 48. If, for example, the line 22A needs to be extended, however, finger pressure on knob 55A will push the spool 52A down to disengage the protrusion 54A from the rectangular aperture 53A, whereby the spool 52A may then be conveniently rotated within the compartment 50A to pay out more line 22A. When the knob 55A is released, the spring 59A will return the protrusion 54A to the aperture 53A, whereby the spool 52A cannot thereafter be rotated.

Although the shape of the protrusions 54A–D and apertures 53A–D is illustrated as square, it will be noted that they may be provided with any non-circular configuration suitable for present purposes, except that such configuration is preferably that of an equilateral polygon such as a pentagon or hexagon. Thus, the spools 52A–D may be rotated to pay out their respective lines 22A–D in equal segments of substantially predetermined length perferably functionally related to the operation of the depicted apparatus.

For the purpose of further clarity, FIG. 4 is shown with three spools 52B–D properly disposed within their respective compartments 50B–D in the rotary body 48, but with the fourth spool 52A omitted from the compartment 50A. Thus, the circular configuration of the compartments 50A–D will be clearly apparent, as well as the non-circular configuration of the apertures 53A–D.

In operation, the apparatus of FIGS. 1 – 6 is assembled in the condition shown in FIG. 2, with cutting lines 22A–D extending generally radially outwardly therefrom to the desired lengths. Thereafter, rotary body 48 is rotated by rotation of shaft 29 to the desired rotational speed. As a result, lines 22A–D will be extended radially outwardly therefrom to the desired lengths. Thereafter, rotary body 48 is rotated by rotation of shaft 29 to the desired rotational speed. As a result, lines 22A–D will be extended radially outwardly from body 48 within its cutting plane, where cutting, lawn edging, or the like may be effected. As lines 22A–D become shortened through use, they can thereafter be restored to their original cutting length by terminating rotation of rotary body 48, pressing down on the knobs 55A–D of each of spools 52A–D, and pulling on lines 22A–D to extend them as desired. Thereafter, pressure is relieved on each of the knobs 55A–D, and thrust springs 59A–D urge the spools 52A–D back to the lock position, at which point cutting operations can be continued.

Figure 7:
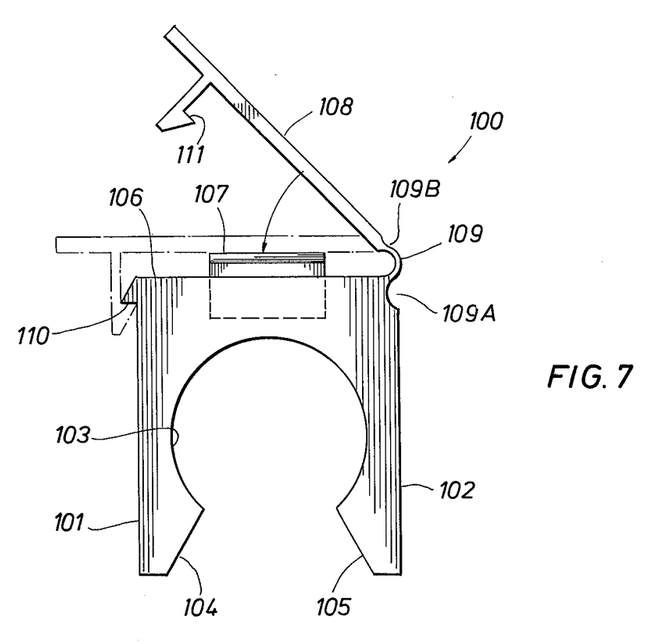
FIG. 7 is a general pictorial view of another different line cutter embodiment of the present invention.
Figure 8:
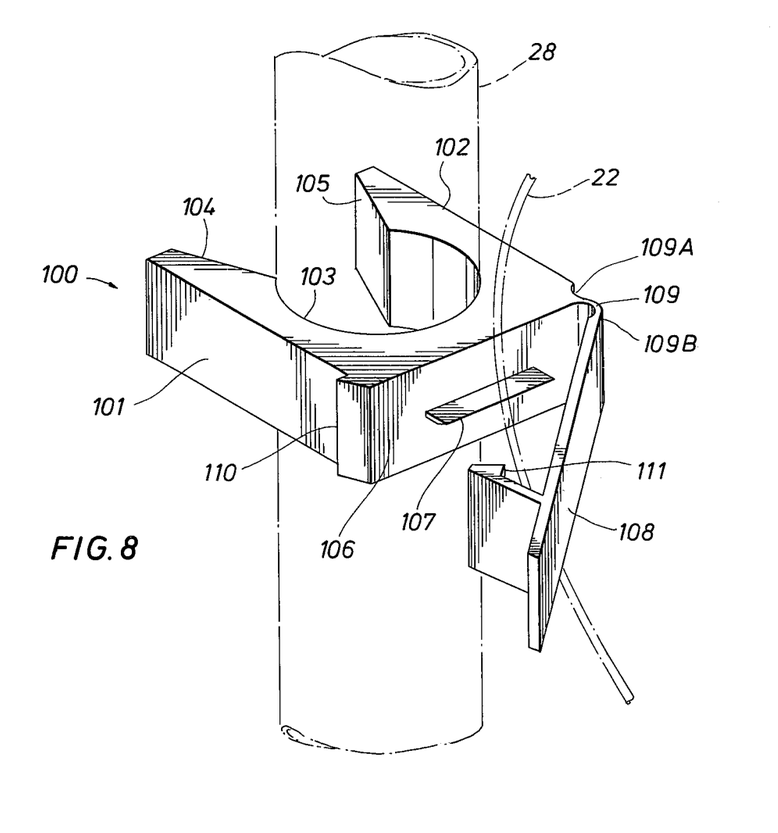
FIG. 8 is an isometric view of the line cutter apparatus depicted in FIG. 7.

Referring now to FIGS. 1, 2, 7 and 8, it may be seen that a cutting knife assembly designated generally at 100 is therein depicted, and as more particularly shown in FIGS. 1 and 2, the knife assembly is attached to tubular member 14 at a point above the cutting plane of the lines 22A–D. By virtue of the unique resilient construction of the knife assembly 100, it may be easily attached to and removed from tubular member 14 for selective location at any one or more sites on tubular member 14 above the cutting plane. Thus, as depicted in FIGS. 7 and 8, the assembly 100 will be seen to include a pair of resilient nylon gripping legs 101 and 102. Legs 101 and 102 are formed interiorily thereof with a fastening aperture surface 103 of a size sufficient to accommodate tubular member 14. When, for example, it is desired to mount knife assembly 100 onto tubular member 14, it is simply necessary to spread the gripping legs 101 and 102 apart and engage same about tubular member 14. The bevelled edges 104 and 105 of the legs 101 and 102 aid in guiding the legs about the tubular member 14, whereby the unit is mounted thereon with aperture surface 103 flush therewith and in abutting relationship thereto. Since the assembly is of one piece nylon construction, legs 101 and 102 are flexible and resilient and can be manually forced apart for easy accommodation on tubular member 14. It should be apparent that to remove the knife assembly from tubular member 14, it is simply necessary to spread the gripping legs 101 and 102 apart as at 104 and 105, whereupon the assembly may be slipped from tubular member 14.

Knife assembly further includes at its upper end, as seen in FIG. 7, a flat planar surface 106 which mounts therein a replaceable cutting blade segment 107. The surface 106 is suitably slotted to removably and replaceably accommodate the blade 107. Thus, if blade 107 becomes dulled through use, a fresh blade may be substituted. A force plate member 108 is integrally united to assembly 100 at hinge 109. The member 108 constitutes the means whereby the cutting lines 22A-D may be trimmed to the desired length when laid between blade 107 and force plate 108. Thus, to cut line 22A to a 6 inch effective length, it is necessary to pay out 7-8 inches of line 22A from spool 52A as above described. Line 22A is then pulled upwardly towards assembly 100 with the terminal end passing between blade 107 and plate 108. The plate 108 is then pushed towards surface 106 whereby the excess inch or so of line 22A is removed by blade 107 passing therethrough.

Assembly 100 further includes a lip 110 which cooperates with a fastening element 111 to hold plate 108 against knife blade 107 when the assembly is not in use. When it is desired to use assembly 100 to cut one of lines 22A-D to an appropriate length, plate 108 is pulled upwardly to disengage fastener 111 from lip 110. In any event, the fastener and lip provide a means whereby the operator of the device is not injured by means of an exposed cutting blade.

As hereinbefore stated, it is contemplated to use lines 22A-D with effective cutting lengths of about 6.0 inches. Accordingly, it should be apparent that this necessitates the proper location of assembly 100 at a site a sufficient distance above the cutting plane and on tubular member 14 to accomplish this. Thereafter, in order to cut lines 22A-D to a 6.0 inch length, it is simply necessary to grasp each line and to cut of the excess portion individually by passing the line between blade 107 and force plate 108, and forcing plate 108 towards surface 106. If longer or shorter cutting lengths are desired, it is merely required to slide assembly 100 up or down tubular member 14 as the case may be. Hinge 109 is formed in plate 108 by suitably scoring the plate 108 at two or more locations 109A, 109B. This provides a unitary one-piece construction of assembly 100 and without the necessity of a plurality of separate parts other than replaceable blade 107. It should therefore be apparent, that assembly 100 provides a simple and convenient manner for the operator 11 of the device to cut lines 22A-D to the prescribed length, and thereby eliminates the need of the operator to carry some kind of cutting device such as a pocket knife on his person.

It is a particular feature of this invention, as hereinbefore explained, that provision is taken to distribute stress in the cutting lines over as great a length as possible, and this is done by providing that the portions of the lines enclosed within any part of the apparatus are located only adjacent straight or curvilinear surfaces. This is of particular importance insofar as the sidewall portions of the various windows are described, since it has been determined that these surfaces constitute the location of the greatest chance for such "kinkage" and stress fatigue. Referring to FIG. 6, it will be seen how the sidewalls 65 of the various windows 70A-D have curvilinear surfaces having substantial radii for this reason.

It has been determined that, for the embodiment of the invention depicted herein the optimum parameters will call for nylon lines having diameters of not substantially less than 0.035 inches nor substantially more than 0.125 inches, an RPM of between 2500-6000, and a cutting length (the length extending beyond the periphery of the cutting head) of substantially 5-9 inches.

In a more precise relationship, the optimum RPM is preferably stated in terms of tip velocity (since it is the terminal inch of each line that is effective for present purposes), and may thus be stated as follows:

$$Vmin = \frac{5,600}{\sqrt[3]{d}} \quad \text{or} \quad \frac{5,600}{d^{0.331}}$$

and $$Vmax = \frac{21,000}{\sqrt[16]{d}} \quad \text{or} \quad \frac{21,000}{d^{0.063}}$$

wherein $V$ is the tip velocity of the cutting lines in feet per minute, and $d$ is the cross-sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocities will preferably be between 14,000-25,000 feet per minute, and if the line diameter is 0.100 inches, the tip velocity will be between 12,000-23,000 feet per minute.

As hereinbefore mentioned, the cutting effectiveness is a function of the weight of the lines as well as their tip velocity, and thus it has been determined that in a preferred embodiment of the present invention, the lines will be formed of a material having a specific gravity of not substantially less than 0.90 nor substantially greater than 1.60. Since cutting is effected by substantially only the last inch of each line, it may be stated that the lines should be a dimension such that each line has a kinetic energy of not substnatially less than 0.03 foot-lbs., nor substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free travelling or unsupported length of not substantially less than 0.50 times the diameter of the cutting head, nor substantially more than 2.2 times such diameter, and this appears to be especially significant.

As hereinbefore explained, it is a feature of the present invention to provide against excessive string or line breakage by substantially reducing friction between the surface of the cutting line and other objects such as bearing portions of the rotary head, or adjacent surfaces of the cutting line itself. Referring now to FIG. 4, it has been shown that the four windows 70A-D are each composed of a pair of curvilinear and spaced apart sidewalls 65. In this embodiment of the present invention, each of the four cutting lines 22A-D is composed of a coiled portion 61 wound about one of the spools 52A-D, and a free travelling end portion extending along a tangent thereto outwardly through the respective one of said windows 70A-D. Accordingly, each of the four lines 22A-D tends to abut the trailing one of the pair of sidewalls 65 composing the respective one of the four windows 70A-D, rather than the sidewall 65 which leads the line as it is carried arcuately about by rotation of the cutting head assembly 15.

As also hereinbefore explained, each of the four cutting lines 22A-D tends to vibrate longitudinally as the cutting head 15 is rotated, and thus to rub or vibrate against the trailing sidewall 65 of each of the windows 70A-D in a manner to generate sufficient heat to at least partially melt the cutting lines 22A-D at a point along their lengths where they contact the said trailing sidewalls 65. The elastic line retainers 62A-D tend to minimize such rubbing to some extent by tending to hold the lines 22A-D immobile at these points, but such holding effort as may be exerted by the retainers 62A-D must of necessity be minimal so as not to restrict the ease whereby new lengths of the cutting lines 22A-D may be paid out as desired.

It has been found beneficial, therefore, to provide these trailing sidewalls 65 with inserts 65A-D preferably formed of a material which has a reduced tendency to develop friction from engagement with the vibrating cutting lines 22A-D, and further preferably having a smooth or polished surface for carrying the cutting lines 22A-D. These inserts may be formed of a variety of different materials which are suitable for such purposes, but it has been found that a polished metal such as brass or stainless steel is especially suitable.

It should be noted, of course, that if the rotary body 48 is itself formed of brass or stainless steel or the like, or if at least that portion of the rotary body 48 which constitutes each trailing sidewall 65 is formed of such material, then there is no need for the inserts 65A-D as separate components in the cutting head assembly 15. For various reasons, however, it is highly desirable to form the rotary body 48 and other major components out of a high impact plastic such as nylon or the like, and although such a material may be provided with sidewalls 65 having a smooth high gloss finish or surface, a nylon-to-nylon vibrational engagement tends nonetheless to develop heat to an extent much above the melting point of nylon. Thus, it is preferable to form the rotary body 48 of plastic and to eliminate nylon-to-nylon contact by providing metal inserts 65A-D as heretofore explained. The cutting lines in the apparatus will be subject to vibration and, therefore, heat-producing engagement with their respective bearing surfaces, irrespective of whether the configuration of the apparatus is such that the bearing surfaces of the apparatus trail or lead their respective cutting lines.

In a preferred embodiment of the present invention, it has been determined that an effective length-to-diameter ratio for a nylon monofilament line or the like, will often be greater than 50:1 and is preferably about 75:1 for present purposes. It has further been found that the best cutting line for the purposes of this invention are extruded nylon line, having a diameter of about 0.060 inches to about 0.125 inches, with 0.08 inches being preferred. The normal rotating speed will be on the order of 2500-6000 RPM with 4600 RPM being preferable during normal use of the equipment.

It has been determined that for the embodiment disclosed herein, the optimum parameters call for a cutting length (the length extending beyond the periphery of the cutting head) of substantially 5-9 inches, with a cutting length of about 6.0 inches being preferred. A head diameter of about 6.0 inches is desirable, thus providing a cutting path of about 18.0 inches, although cutting heads of substantially larger or smaller diameters are contemplated herein.

It will thus be apparent, that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

I claim:

1. Apparatus for cutting vegetation and the like, comprising:
   a housing rotatable in a cutting plane about an axis of rotation and having at least one flexible non-metallic line with a free end extending outward of the periphery of said housing and with an unobstructed peripheral travel in said cutting plane,
   driving means for revolving said housing about an axis and to extend said free end of said line radially from said housing into said cutting plane,
   tubular handle means connected between said housing and said driving means to manipulate said apparatus,
   a cutting blade assembly for manually and selectively cutting said line adjacent said free end,
   mounting means for securing said cutting blade assembly on said tubular handle means in spaced relationship from said cutting plane, and
   said mounting means providing for movement of said cutting blade assembly to a selected location along said tubular handle means whereby said line in taut configuration is severed by said cutting blade assembly to a predetermined working length of said free end of said line which extends radially into said cutting plane for effective and efficient vegetation cutting.

2. The apparatus described in claim 1 wherein said cutting blade assembly includes a pair of flexible mounting legs and a force plate member hingedly and integrally attached thereto and movable toward and away from said cutting blade.

3. The apparatus described in claim 2 wherein said cutting blade is replaceably inserted in said assembly.

4. The apparatus described in claim 3 wherein there is included in said assembly means for locking said force plate member in covering relationship to said cutting blade.

5. The apparatus described in claim 4 wherein said pair of flexible mounting legs define an interior curvilinear surface for receiving said tubular handle means in abutting relationship thereto.

6. The apparatus described in claim 5 wherein each mounting leg includes a lower bevelled surface thereon.

7. The apparatus described in claim 6 wherein the assembly and said force plate member are of one-piece unitary construction with the hinge of said force plate member being formed by at least one scored surface therealong.

* * * * *